UNITED STATES PATENT OFFICE.

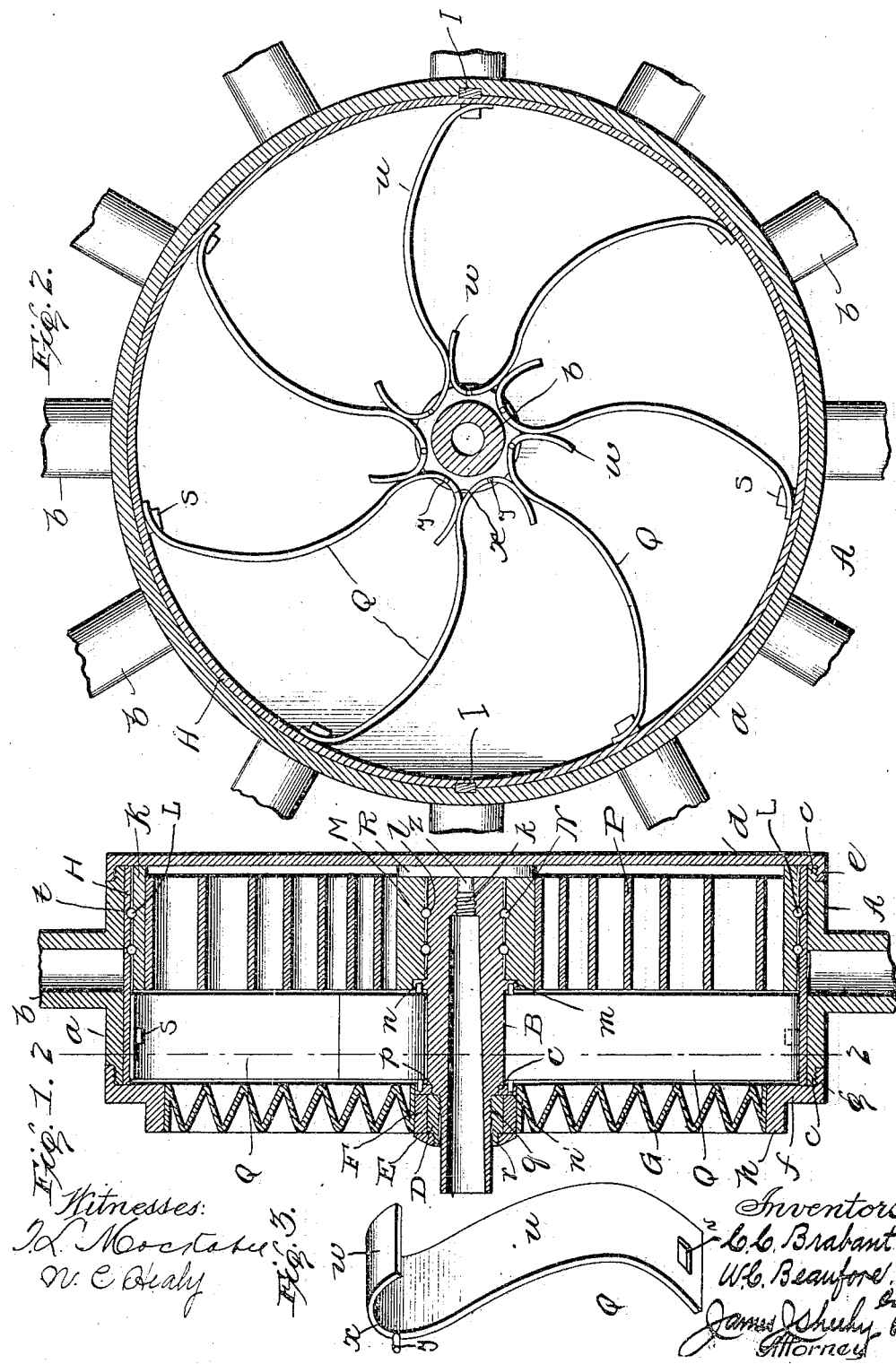

CHARLES C. BRABANT AND WILLIAM C. BEAUFORE, OF ALPENA, MICHIGAN.

WHEEL-HUB.

No. 809,666.   Specification of Letters Patent.   Patented Jan. 9, 1906.

Application filed April 12, 1905. Serial No. 255,132.

*To all whom it may concern:*

Be it known that we, CHARLES C. BRABANT and WILLIAM C. BEAUFORE, citizens of the United States, residing at Alpena, in the county of Alpena and State of Michigan, have invented new and useful Improvements in Wheel-Hubs, of which the following is a specification.

This invention pertains to wheel-hubs, more particularly wheel-hubs for use on motor-vehicles; and it has for its object to provide a wheel-hub susceptible of being quickly and easily made of pressed steel and embodying such a construction that it is adapted to efficiently take up shock and jar and prevent the transmission of the same to the body of a vehicle even when the wheel in which it is comprised is provided with a solid tire.
The invention will be fully understood from the following description and claims when taken in connection with the accompanying drawings, forming part of this specification, in which—
Figure 1 is a diametrical section of the hub constituting the present and preferred embodiment of our invention. Fig. 2 is a section taken in the plane indicated by the line 2 2 of Fig. 1, and Fig. 3 is a detail view of one of the auxiliary springs of the hub removed.

Similar letters designate corresponding parts in all of the views of the drawings, referring to which—

A is the casing of the novel hub. The said casing comprises a circular section $a$, having spoke-sockets $b$ and also having reduced and exteriorly-threaded edge portions $c$, a wall $d$, having an inwardly-directed and interiorly-threaded flange $e$, screwed on the outer edge portion $c$ of the circular section $a$ and designed to close the outer end of the casing, and a ring $f$, having an outwardly-directed and interiorly-threaded flange $g$, screwed on the inner edge portion of the section $a$ and also having an inwardly-directed flange $h$.

B is a tubular box contained in the hub and normally arranged in the position shown in Fig. 1 relative to the casing A. The said tubular box is designed to receive an axle, preferably a rear axle, of a motor-vehicle and is provided adjacent to its outer end with interior threads $k$, designed to engage complementary threads on the vehicle-axle with a view of fixing the hub thereto. It is also provided with circumferential grooves $l$, an exterior collar $m$, having transverse sockets $n$ in its inner side, an exterior shoulder $p$, and an exterior thread $q$, all clearly shown in Fig. 1.

Against the shoulder $p$ of the box B is arranged a removable washer C, having transverse sockets $n'$ in its inner side, while engaged with the thread $q$ of the box is a nut D, having a reduced and threaded inner end $r$. On said end $r$ of the nut D is an interiorly-threaded washer E, between which and the washer C is interposed a heavy ring F, preferably of india-rubber. This ring loosely surrounds the nut D and is designed to serve in connection with a flexible bellows-like wall G to exclude dust and dirt from the inner side of the casing A, while permitting free vertical movement of the said casing with respect to the box B. The flexible bellows-like wall G surrounds and is connected to the ring F and has it's outer edge suitably connected to the ring $f$ of the casing A.

H is an annular shell, preferably of steel, which is arranged within and close to the circular section $a$ of the casing A and is connected with the said casing, preferably through the medium of keys I, disposed in meeting grooves in the shell and casing. The said shell H is provided with a circular series of interior teats or projections $s$, which are arranged in a vertical plane adjacent to the inner end of the casing A and are designed for a purpose presently set forth.

K is an annulus arranged within the shell H and having ball-races $t$ in its outer side. L L are antifriction-balls arranged to move in said races $t$ and interposed between the annulus K and the shell H, so as to enable the latter to freely turn around upon the former.

M is a sleeve surrounding the outer portion of the box B, N N antifriction-balls arranged in the grooves $l$ of the box and interposed between the box and the sleeve M, and P a coiled spring surrounding the sleeve M and connected at its inner end to the said sleeve and at its outer end to the annulus K. The purpose of the said coiled spring P is to prevent the transmission of shock and jar from the casing A to the box B, while in no way interfering with the rotation of the casing A and the box B with the vehicle-axle on which the box is secured.

Q Q are springs arranged alongside of the spring P and designed to assist the latter spring in preventing the transmission of shock and jar from the casing A to the box B. These springs Q are identical in construction, and therefore a detailed description of the one shown in Fig. 3 will suffice to impart a definite understanding of all. The said spring Q, Fig. 3, comprises a main curved portion $u$, having an aperture $v$ adjacent to its outer end to receive one of the teats $s$ of the shell H, an auxiliary curved portion $w$, extending outwardly from a bight $x$ at the inner end of the main portion $u$, and lateral trunnions $y$, extending from the said bight and disposed in the sockets $n$ $n'$ of the collar $m$ and washer C, respectively, as shown in Figs. 1 and 2. From the foregoing it follows that in the event of power being applied to the casing A to rotate the wheel, of which the hub forms a part, the springs Q will serve to transmit rotary motion from the said casing A to the box B and at the same time will prevent transmission of shock and jar to the box B and the vehicle in the event of the casing being suddenly turned, as when a motor-vehicle is started.

R is a circular plate interposed between the outer end of the box B and the wall $d$ of casing A and having a central projection $z$ let into a socket in the outer end of the said box B. This plate R is designed to prevent the outer end of the box B and the outer end of the sleeve M from contacting with the outer wall $d$ of the casing.

Notwithstanding the practical advantages which we have hereinbefore ascribed to our novel wheel-hub it will be apparent that the hub is simple and inexpensive and is well adapted to withstand the shocks and strains to which wheel-hubs, particularly those used on the rear axles of motor-vehicles, are ordinarily subjected.

We have specifically described the construction and relative arrangement of the parts embraced in the present and preferred embodiment of our invention in order to impart a definite understanding of the said embodiment. We do not desire, however, to be understood as confining ourselves to the said specific construction and relative arrangement of parts, as such changes or modifications may be made in practice as fairly fall within the scope of our invention as claimed.

Having described our invention, what we claim, and desire to secure by Letters Patent, is—

1. In a wheel-hub, the combination of a central portion, a casing loosely surrounding the said central portion, a spring contained in the casing and interposed between the same and the central portion for sustaining said central portion and preventing the transmission of shock and jar thereto, antifriction devices interposed between the said spring and the central portion, antifriction devices interposed between the spring and the casing, and one or more other springs interposed between and connected to the central portion and the casing and adapted to connect the casing and the central portion so as to yieldingly transmit motion from one to the other.

2. In a wheel-hub, the combination of a central portion, a casing loosely surrounding the said central portion, a spring contained in the casing and arranged between the casing and the central portion and free from one of said parts; the said spring being designed to sustain the central portion and prevent the transmission of shock and jar thereto, and one or more other springs interposed between and fixed to the central portion and the part of the casing surrounding the central portion so as to transmit motion from the former to the latter.

3. In a wheel-hub, the combination of a central portion, a casing loosely surrounding the said central portion, a spring contained in the casing and arranged between the casing and the central portion and free from one of said parts; the said spring being designed to sustain the central portion and prevent the transmission of shock and jar thereto, and other springs interposed between the central portion and the casing; the latter springs having bights at their inner ends provided with lateral trunnions journaled in the central portion and also having their outer ends connected to the casing.

4. In a wheel-hub, the combination of a central portion, a casing loosely surrounding the said central portion, an annulus arranged in the casing, antifriction devices interposed between the annulus and the casing, a sleeve surrounding the central portion, antifriction devices interposed between the sleeve and the central portion, a coiled spring surrounding the sleeve and connected to the sleeve and the annulus, and other springs arranged at the side of the coiled spring and interposed between and connected to the central portion and the casing.

5. In a wheel-hub, the combination of a central portion having a collar provided with transverse sockets, a washer removably secured on said central portion and having transverse sockets, a casing loosely surrounding the central portion and having interior teats or projections, and springs having apertures receiving said teats or projections and also having trunnions disposed in the sockets of the collar and washer.

6. In a wheel-hub, the combination of a central portion having a collar provided with transverse sockets, and also having a shoulder $p$ and exterior threads $q$, a nut mounted on said central portion in engagement with the thread $q$ thereof and bearing a collar, a washer interposed between said nut and the shoulder $p$, and having transverse sockets, a ring, of yielding material, surrounding the nut and interposed between the collar thereon and the washer, a casing loosely surrounding the central portion and having interior teats or projections, a flexible, bellows-like wall connecting the ring and the casing, springs having apertures receiving the teats or projections of the casing and also having lateral trunnions disposed in the sockets of the collar and washer, and a coiled spring arranged in the casing alongside the first-mentioned springs and surrounding the central portion and interposed between the same and the casing.

In testimony whereof we have hereunto set our hands in presence of two subscribing witnesses.

CHARLES C. BRABANT.
WILLIAM C. BEAUFORE.

Witnesses:
W. A. PRINCE,
P. CULLIGAN.